Oct. 12, 1954     A. J. COOK     2,691,231
AUTOMATIC ANIMAL GATE
Filed Sept. 7, 1951     2 Sheets-Sheet 1
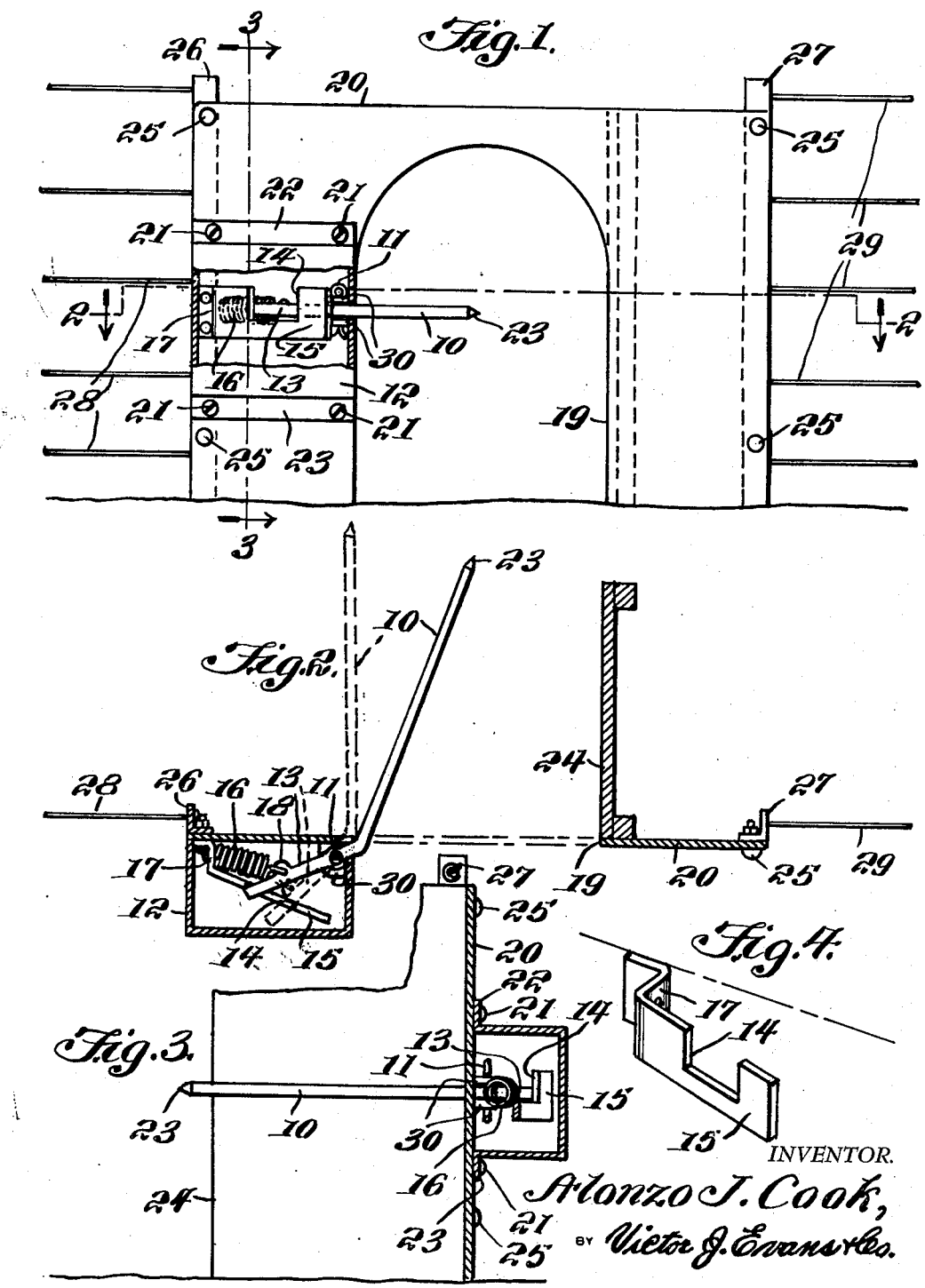

Oct. 12, 1954
A. J. COOK
2,691,231
AUTOMATIC ANIMAL GATE
Filed Sept. 7, 1951
2 Sheets-Sheet 2
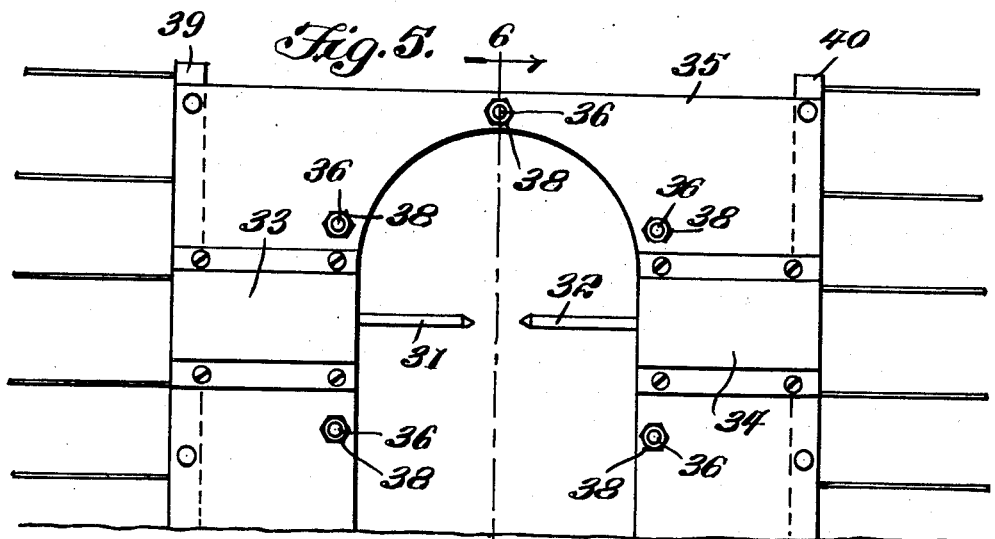
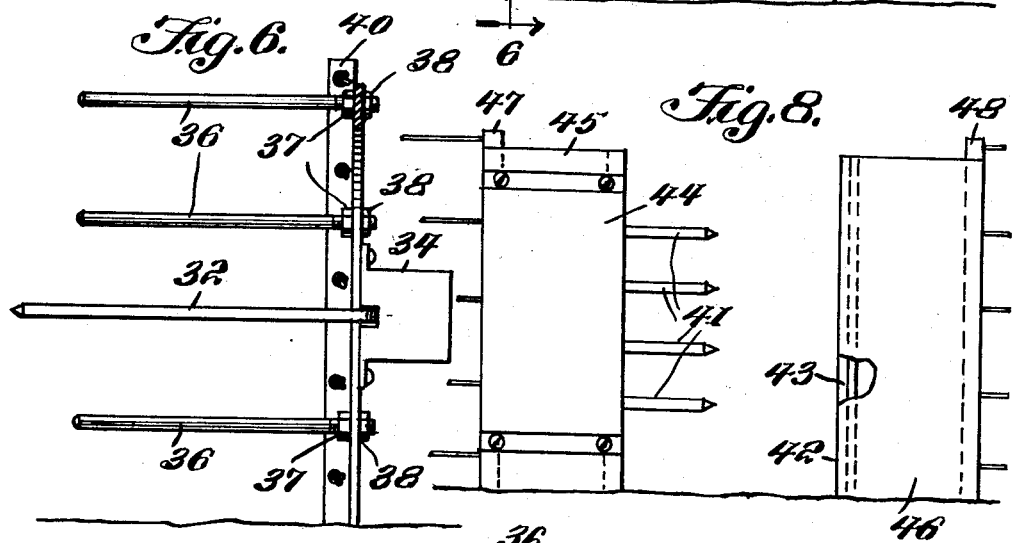
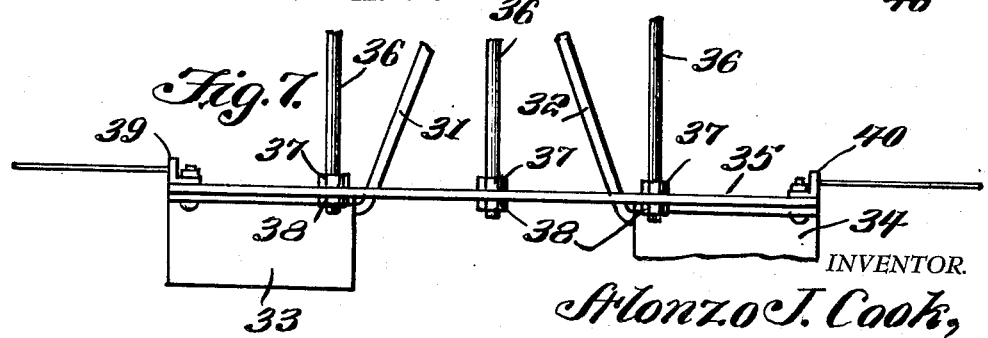
INVENTOR.
Alonzo J. Cook,
BY Victor J. Evans & Co.
ATTORNEYS Patented Oct. 12, 1954

2,691,231

UNITED STATES PATENT OFFICE 2,691,231

AUTOMATIC ANIMAL GATE

Alonzo J. Cook, Long Beach, Calif.

Application September 7, 1951, Serial No. 245,580

3 Claims. (Cl. 39—87)

This invention relates to a gate or trap particularly adapted for use in stock yards and feeding pens, and in particular a gate which permits stock to pass through from one direction and prevents the stock returning from the opposite direction.

The purpose of this invention is to provide a stock gate whereby stock from a feeding pen may pass from the pen into the field and in which the same or other stock are prevented from returning to or entering the feeding pen.

In numerous instances it is desirable to feed certain stock, such as milk cows with auxiliary or additional feed whereas horses, steers, or other animals in the same field receive sufficient sustinance from grazing. In such instances it is desirable to drive the milk cows into a feeding pen and after feeding permit the cows to return to pasture without the necessity of a farm hand opening and closing gates. With this thought in mind this invention contemplates a gate having spring actuated prongs extended into the path of animals passing therethrough whereby the prongs are free to move to the side to permit an animal to pass while traveling in one direction and wherein sharp points of the prangs extend outwardly to prevent the animal passing through from the opposite direction.

The object of this invention is, therefore, to to provide means for forming a gate that automatically operates to permit stock to pass in one direction and which also automatically operates to prevent the stock passing through in the opposite direction.

Another object of the invention is to provide a stock gate in a form of a trap wherein the gate may be readily installed in a barnyard or other fence.

A further object of the invention is to provide an improved automatic gate, particularly adapted for stock feeding pens and the like which is of a simple and economical construction.

With these and other objects and advantages in view the invention embodies a prong pivotally mounted in a casing and means resiliently holding the prong in an outwardly extended position with the casing positioned at one side of an opening through a fence or the like whereas the prong prevents stock passing through the opening in one direction and is readily moved to the side of the opening by stock passing through the opening in the opposite direction.

Other features and advantages of the invention will appear from the following description taken in connection with the drawings wherein:

Figure 1 is a front elevational view illustrating an opening or gate positioned in a fence with a prong mounted in a casing at one side of the opening and extended into the opening and with part of the casing broken away and shown in section.

Figure 2 is a sectional plan taken on line 2—2 of Figure 1 showing the prong with the mounting casing therefor and showing the prong in the outwardly extended position.

Figure 3 is a cross section through the prong mounting casing and associated parts of the gate, taken on line 3—3 of Figure 1.

Figure 4 is a detail illustrating the latch in the casing for holding an arm extended from the pivotal mounting of the prong.

Figure 5 is a front elevational view similar to that shown in Figure 1 showing a modification wherein a plurality of prongs are used in a gate or opening through a fence.

Figure 6 is a cross section taken on line 6—6 of Figure 5 illustrating the stock retaining prongs and also a plurality of guide fingers extended at the sides of the prongs.

Figure 7 is a plan view of the gate, shown in Figure 5, showing the prongs extended inwardly from the side and also showing guide pins extended from the sides and upper end of a wall around the opening.

Figure 8 is a detail illustrating a further modification wherein a plurality of prongs are used in a stock opening through a fence or the like.

Referring now to the drawings wherein like reference characters denote corresponding parts the improved automatic stock gate of this invention includes a prong 10 pivotally mounted by a pin 11 in a casing 12, and, as illustrated in Figure 2 the prong is provided with a lever 13 that extends into a notch 14 in a latch bar 15, the prong being held by a spring 16, one end of which is attached to the base 17 of the bar 15, and the other to an eye 18 on the lever 13.

In the design as illustrated in Figures 1, 2 and 3 the prong extends from the casing 12 into an opening or passage 19 in a panel or wall 20 and with the casing 12 secured to the wall by screws or bolts 21 which extend through flanges 22 and 23 the prong will extend into the opening in such a manner that it will be difficult for stock to pass through against the point 23 of the prong.

The wall 20 may be provided with a guide panel 24 which extends from one side of the opening 19, as illustrated in Figure 2. The guide 24 is positioned to prevent stock passing through the opening from the side thereof opposite to that in which the prong 10 is positioned.

The ends of the wall 20 are attached, by bolts 25 to posts 26 and 27, and fence wires 28 and 29 extend from the posts as shown.

The pin 11 on which the prong 10 is mounted is held in lugs 30 with the base of the prong, from which the lever 13 extends, positioned between the lugs.

In the design shown in Figures 5, 6 and 7 prongs 31 ad 32, similar to the prong 10 are pivotally mounted in casings 33 and 34, respectively on a wall 35 and a plurality of guide pins 36 which are mounted in the wall 35 by nuts 37 and 38, on threaded ends thereof, extend from the wall substantially parallel to the plane of the prongs 31 and 32 whereby the stock are prevented from crawling in under the prongs or climbing over the prongs or walls.

The plate or wall 35 is similar to the wall 20 and the edges are attached to fence posts 39 and 40, respectively similar to posts 26 and 27.

In the design illustrated in Figure 8 a plurality of prongs 41 are positioned on one side of the opening 42 and a guide panel or wall 43 is provided on the opposite side of the opening similar to the panel 24, and it will be understood that as many of the prongs such as the prongs 41 shown in Fig. 8 or such as the prongs 10 shown in Figs. 1 and 2, may be used as may be desired and the prongs may be positioned in one or both sides of the opening, as illustrated in Figs. 1 and 2 wherein a single prong is used or as illustrated in Fig. 5 wherein prongs 31 and 32 extend inwardly from both sides of the opening.

In Figure 8 a plurality of prongs are mounted in a single casing, which is indicated by the numeral 44 and the casing is mounted on a wall or panel 45 with a corresponding panel 46 provided at the opposite side of the opening to provide means for mounting the guide wall 43. Fence posts 47 and 48 similar to the posts 26 and 27 are shown attached to the edges of the walls 45 and 46, respectively.

With the parts arranged in this manner one or a plurality of prongs may extend into an opening through a fence such as a gate and animals from one side of the fence may readily pass through the gate by pressing the prong to one side, as indicated by the dotted lines in Figure 2 and the same or other animals upon attempting to pass through the gate from the opposite direction, are stopped by the sharp end of the prong.

This improved stock gate, therefore permits animals to pass from a feeding pen and prevents the same or other animals from entering the feeding pen or the like.

It will be understood that modifications may be made in the design and arrangement of the parts without departing from the spirit of the invention.

What is claimed is:

1. An animal gate obstruction comprising a casing, a prong having a lever extended from one end, means pivotally mounting the prong in the casing, said lever being positioned in the casing and with the prong extended from the casing, and resilient means urging the prong to an outwardly extended position, said casing adapted to be installed on a structure at one side of an opening in said structure.

2. An animal gate device as described in claim 1 wherein a latch bar with a notch therein is provided in the casing, the lever of the prong being positioned in the notch to limit the travel of the prong.

3. In an animal gate assembly, the combination which comprises spaced fence posts, fence wires extended from said posts, a wall having an opening providing passage for cattle therethrough carried by said posts, a guide panel positioned at a right angle to said wall extended from the wall and positioned at one side of the opening therethrough, a casing mounted on said wall and positioned at the side of the opening therethrough opposite to the side on which the guide panel is positioned, a prong pivotally mounted in the casing and extended through the opening in said wall, said prong being adapted to be positioned, selectively, in a position inclined toward the guide panel to coact with the guide panel to prevent passage of stock through the wall, or in a position parallel to said guide panel to permit passage of stock through the opening, a spring in the casing attached to an end of the prong extended into the casing for retaining the prong in said inclined position, and a latch bar in the casing and having a notch therein positioned to receive the end of the prong extended in the casing for retaining the prong in a position parallel to the guide panel for retaining the prong in the position wherein the gate is open.

References Cited in the file of this patent

UNITED STATES PATENTS

| Number | Name | Date |
|---|---|---|
| 1,413,840 | Elliott | Apr. 25, 1922 |
| 1,546,429 | Baker et al. | July 21, 1925 |
| 1,563,637 | Lundblad | Dec. 1, 1925 |
| 1,759,207 | Rose et al. | May 20, 1930 |
| 2,234,985 | Simonds | Mar. 18, 1941 |
| 2,258,896 | Kelker, Jr. | Oct. 14, 1941 |